US008625994B2

(12) United States Patent
Archambault et al.

(10) Patent No.: US 8,625,994 B2
(45) Date of Patent: Jan. 7, 2014

(54) DIRECTIONLESS RECONFIGURABLE OPTICAL ADD-DROP MULTIPLEXER SYSTEMS AND METHODS

(75) Inventors: Jean-Luc Archambault, Severna Park, MD (US); Michael Y. Frankel, Baltimore, MD (US); Loudon Blair, Severna Park, MD (US); Sashisekaran Thiagarajan, Columbia, MD (US)

(73) Assignee: Ciena Corporation, Hanover, MD (US)

( * ) Notice: Subject to any disclaimer, the term of this patent is extended or adjusted under 35 U.S.C. 154(b) by 952 days.

(21) Appl. No.: 12/103,204

(22) Filed: Apr. 15, 2008

(65) Prior Publication Data

US 2009/0232497 A1 Sep. 17, 2009

Related U.S. Application Data

(63) Continuation-in-part of application No. 12/045,933, filed on Mar. 11, 2008.

(51) Int. Cl.
*H04J 14/00* (2006.01)
*H04J 14/04* (2006.01)
*H04J 14/02* (2006.01)

(52) U.S. Cl.
USPC ............... 398/83; 398/43; 398/44; 398/45; 398/79

(58) Field of Classification Search
None
See application file for complete search history.

(56) References Cited

U.S. PATENT DOCUMENTS

| | | | |
|---|---|---|---|
| 5,838,848 A | 11/1998 | Laude | |
| 6,285,500 B1 | 9/2001 | Ranalli et al. | |
| 6,600,852 B1 | 7/2003 | Augustsson | |
| 6,771,852 B2 | 8/2004 | Hemenway et al. | |
| 6,876,475 B1 | 4/2005 | Trisnadi et al. | |
| 6,922,529 B2 * | 7/2005 | Bortz et al. | 398/5 |
| 6,937,993 B1 | 8/2005 | Gabbita et al. | |
| 7,043,110 B1 | 5/2006 | Trisnadi et al. | |
| 7,072,539 B2 | 7/2006 | Wu et al. | |
| 7,092,599 B2 | 8/2006 | Frisken | |
| 7,099,529 B2 | 8/2006 | Wang et al. | |

(Continued)

OTHER PUBLICATIONS

Lei Zong, Xiaodong Huang, Ting Wang, Philip Ji, Omatsu Matsuda, Milorad Cvijetic; "A Novel Tunable DeMEX/MUX Solution for WSS-Based ROADM and WXC Nodes"; 1. NEC Laboratories America, Inc., Princeton, NJ; 2. Department of Computer Science, the University of Texas in Dallas, Richardson, TX; 3. NEC Corporation, Chiba 270-1198, Japan; 4. NEC America, Inc., Herndon, VA; (c)2005 Optical Society of America; OCIS codes: Fiber optics and optical communications; Networks.

(Continued)

*Primary Examiner* — Ken Vanderpuye
*Assistant Examiner* — Darren E Wolf
(74) *Attorney, Agent, or Firm* — Clements Bernard PLLC; Christopher L. Bernard; Lawrence A. Baratta, Jr.

(57) ABSTRACT

The present invention provides a directionless reconfigurable optical add/drop multiplexer (ROADM) system. The present invention provides a scalable all-optical switching element that includes a combination of 1×N wavelength selective switches (WSS), 1×N splitters/combiners, optical amplifiers, and tunable filters to provide a fully non-blocking solution which can be deployed in a scalable manner. The 1×N splitters are configured to split multiples copies of a plurality of drop wavelengths which can be amplified and sent to a tunable filter which selects out a particular wavelength for drop. The 1×N combiners are configured to combine multiple add wavelengths for egress transmission.

22 Claims, 12 Drawing Sheets

(56) References Cited

U.S. PATENT DOCUMENTS

| | | | |
|---|---|---|---|
| 7,123,592 B2 | 10/2006 | Geile et al. | |
| 7,167,441 B2 | 1/2007 | Donoghue et al. | |
| 7,167,646 B2 | 1/2007 | Chin et al. | |
| 7,171,070 B1 | 1/2007 | Birk et al. | |
| 7,181,139 B2 | 2/2007 | Handelman et al. | |
| 7,184,666 B1 * | 2/2007 | Li et al. | 398/83 |
| 7,200,331 B2 | 4/2007 | Roorda et al. | |
| 7,212,703 B2 | 5/2007 | Wu | |
| 7,212,704 B2 | 5/2007 | Ducellier | |
| 7,218,805 B2 | 5/2007 | Oberg | |
| 7,221,821 B2 | 5/2007 | Eldada | |
| 7,228,027 B1 | 6/2007 | Birk et al. | |
| 7,231,107 B1 | 6/2007 | Zhong et al. | |
| 7,254,327 B1 | 8/2007 | Zhong et al. | |
| 7,257,285 B2 | 8/2007 | Doerr et al. | |
| 7,257,288 B1 | 8/2007 | Strasser et al. | |
| 7,263,253 B2 | 8/2007 | Davis et al. | |
| 7,277,608 B2 | 10/2007 | Isomura et al. | |
| 7,283,709 B2 | 10/2007 | Doerr et al. | |
| 2001/0050790 A1 * | 12/2001 | Graves et al. | 359/110 |
| 2003/0223682 A1 * | 12/2003 | Kinoshita et al. | 385/24 |
| 2004/0208578 A1 * | 10/2004 | Kinoshita et al. | 398/83 |
| 2005/0273516 A1 | 12/2005 | Patrick et al. | |
| 2005/0273521 A1 | 12/2005 | Patrick et al. | |
| 2006/0031354 A1 | 2/2006 | Patrick et al. | |
| 2006/0031355 A1 | 2/2006 | Patrick et al. | |
| 2006/0031431 A1 | 2/2006 | Patrick et al. | |
| 2006/0031432 A1 | 2/2006 | Patrick et al. | |
| 2006/0031433 A1 | 2/2006 | Patrick et al. | |
| 2006/0031481 A1 | 2/2006 | Patrick et al. | |
| 2006/0031930 A1 | 2/2006 | Patrick et al. | |
| 2006/0034237 A1 | 2/2006 | Patrick et al. | |
| 2006/0045528 A1 | 3/2006 | Gumaste et al. | |
| 2006/0098981 A1 | 5/2006 | Miura et al. | |
| 2006/0127087 A1 * | 6/2006 | Kasai et al. | 398/45 |
| 2006/0198575 A1 | 9/2006 | Doerr et al. | |
| 2006/0198583 A1 | 9/2006 | Oikawa et al. | |
| 2006/0198636 A1 | 9/2006 | Charlet et al. | |
| 2006/0210268 A1 | 9/2006 | Gumaste et al. | |
| 2006/0210273 A1 * | 9/2006 | Gumaste et al. | 398/83 |
| 2006/0228072 A1 | 10/2006 | Davis et al. | |
| 2006/0275035 A1 | 12/2006 | Way | |
| 2007/0009204 A1 | 1/2007 | Ducellier et al. | |
| 2007/0036480 A1 | 2/2007 | Wu | |
| 2007/0081761 A1 | 4/2007 | Doerr et al. | |
| 2007/0116462 A1 | 5/2007 | Peloso et al. | |
| 2007/0140618 A1 | 6/2007 | Doerr et al. | |
| 2007/0160321 A1 | 7/2007 | Wu et al. | |
| 2007/0183777 A1 | 8/2007 | Peloso et al. | |
| 2007/0196106 A1 | 8/2007 | Eiselt | |
| 2007/0204046 A1 | 8/2007 | Batta et al. | |
| 2007/0237451 A1 | 10/2007 | Colbourne | |
| 2007/0242953 A1 | 10/2007 | Keyworth et al. | |
| 2007/0255640 A1 | 11/2007 | Gumaste | |
| 2007/0269210 A1 | 11/2007 | Doerr et al. | |
| 2007/0269211 A1 | 11/2007 | Doerr et al. | |
| 2007/0274724 A1 | 11/2007 | Gumaste | |

OTHER PUBLICATIONS

Paolo Ghelfi, Filippo Cugini, Luca Poti, Antonella Bogoni, Piero Castoldi, Rodolfo Di Muro, Bimal Nayar; "Optical Cross Connects Architecture with Per-Node Add&Drop Functionality"; CNIT, Pisa, Italy; (c) 2006 Optical Society of America; OCIS codes: Networks; Optical communications.

Sashisekaran Thiagarajan, Loudon Blair, Joseph Berthold; "Direction-Independent Add/Drop Access for Multi-Degree ROADMs"; CTO, Ciena Corp., Linthicum, MD; (c)Optical Society of America; OCIS Codes: Networks; Optical Communications; All-Optical Networks. This paper appears in: Optical Fiber Communication/National Fiber Optic Engineers Conference, 2008, OFC/NFOEC 2008 Conference; Issue Date: Feb. 24-28, 2008.

V. Kaman, R. J. Helkey, and J. E. Bowers; "Multi-Degree ROADM's with Agile Add-Drop Access"; Callen Networks, 25 Castilian Drive, Goleta, CA 93117. This paper appears in: Photonics in Switching, 2007; Issue Date: Aug. 19-22, 2007.

* cited by examiner

US 8,625,994 B2

DIRECTIONLESS RECONFIGURABLE OPTICAL ADD-DROP MULTIPLEXER SYSTEMS AND METHODS

CROSS-REFERENCE TO RELATED APPLICATION(S)

This application is a continuation-in-part of co-pending U.S. patent application Ser. No. 12/045,933 filed Mar. 11, 2008, and entitled "DIRECTIONLESS OPTICAL ARCHITECTURE AND HIGHLY AVAILABLE NETWORK AND PHOTONIC RESILIENCE METHODS," the contents of which are incorporated in full by reference herein. Additionally, this application relates to commonly assigned U.S. Pat. No. 7,308,197 issued Dec. 11, 2007, and entitled "MODULAR ADD/DROP MULTIPLEXER INCLUDING A WAVELENGTH SELECTIVE SWITCH," the contents of which are incorporated in full by reference herein.

FIELD OF THE INVENTION

The present invention relates generally to optical networks. More particularly, the present invention provides a directionless reconfigurable optical add/drop multiplexer (ROADM) system which is fully non-blocking and which can be upgraded in a flexible and incremental manner.

BACKGROUND OF THE INVENTION

There are a number of different ROADM systems on the market today. Some use wavelength blockers, some use wavelength-selective switches (WSS) and others are based on Planar Lightwave Circuit (PLC) technology. Earlier ROADM configurations were limited to 2-degree nodes, but today wavelength-selective switches have made it possible to design cost-effective, multi-degree ROADM nodes. Multi-degree ROADM's provide a lot of flexibility in a wavelength division multiplexed (WDM) network by allowing arbitrary wavelengths to be added or dropped at a particular node or to be switched from one degree to another. One limitation typically shared by current ROADM products is that they are not "directionless", i.e. a local add/drop transceiver can only be physically connected to one particular degree (i.e., direction) of the node. If a user wants to switch a particular transceiver to a different degree, the user must manually disconnect the transceiver and reconnect it to a different physical port associated with the new degree.

Directionless ROADMs make it possible for operators to dynamically provision local transceivers to different degrees as they reconfigure their networks. Additionally, directionless ROADMs lay the foundation for network architectures supporting all-optical mesh restoration. One exemplary implementation of a directionless ROADM includes the addition of a photonic cross-connect (PXC) to enable routing of the local add/drop channels to arbitrary degrees on the ROADM.

Referring to FIG. 1, an exemplary 4-degree ROADM 10 is constructed with two add/drop clients, i.e. an Internet Protocol (IP) router/switch 12 and an Optical Transport Network (OTN) switch 14. In a first configuration 20, the ROADM 10 is constrained, in that each add/drop client signal 22, 24 can only route through one degree 30 (i.e., direction). Note that express waves 32 can still pass from any-to-any network fiber, so long as these are not dropped locally. In a second configuration 40, a directionless PXC 42 adds a "switch matrix" to the Add/Drop signal bank, which allows add/drop clients truly to be switched to any degree dynamically. Again, express waves can pass from any-to-any degree.

Directionless ROADMs have been disclosed using large N×N cross-connects. For example, these are disclosed by V. Kaman et al., "Multi-Degree ROADM's with Agile Add-Drop Access," (available at www.calient.net/_docs/Photonic-SwtConf_MultiDegreeROADMs_07.pdf) and by Sashisekaran Thiagarajan et al., "Direction-Independent Add/Drop Access for Multi-Degree ROADMs", OFC 2008 Proceedings, OThA7, Optical Society of America, February 2008. Disadvantageously, the problem with large N×N cross-connects is that N scales as the number of degrees multiplied by the number of wavelengths in each degree. For example, a degree 8-node with 80 wavelengths per fiber requires a 640× 640 cross-connect which is beyond the current state-of-the art and involves a very high up-front cost even if only a few channels are needed initially, and this would increase to 1280×1280 for 100% add/drop capability. The very large number of interconnects also make it very difficult to install or service the switch fabric and the problem gets worse if a redundant switch fabric is needed for network availability reasons.

Two other approaches to ROADMs are disclosed by Ghelfi et al., "Optical Cross Connects Architecture with per-Node Add & Drop Functionality", Ghelfi et al., OFC 2007 Proceedings, NTuC3, Optical Society of America, February 2007. First, Ghelfi et al. disclose an optical cross-connect with per-port Add & Drop (OXC-PAD) using a 1×N WSS in each degree to route drop channels to N local transceivers. Add channels are collected using N×1 combiners. Each transceiver is connected to a pair of 1×N switches that direct the Tx/Rx signals to the WSS/combiner module associated with the selected degree. This approach could make sense for a small degree (e.g., less than degree 5) node with a few (e.g., less than 10) add/drop channels, but it becomes prohibitively expensive for larger nodes, as the minimum number of WSS ports required is given by the number of degrees multiplied by the number of add/drop channels. For example, a degree 8-node with 40 add/drop channels requires on the order of forty 1×8 WSSs, for a total of 320 WSS ports. Eighty 1×8 switches are also required.

In a second approach, Ghelfi et al. add an additional degree to the ROADM and connect add/drop local traffic using that degree. Although this is a low-cost approach, it introduces severe blocking issues since it only allows a single add/drop channel to be provisioned at a given wavelength. To enable efficient use of bandwidth in the network, a directionless ROADM needs to be non-blocking, which means that different add/drop channels can be provisioned at the same wavelength if they are connected to different degrees.

BRIEF SUMMARY OF THE INVENTION

In various exemplary embodiments, the present invention provides a directionless reconfigurable optical add/drop multiplexer (ROADM) system. The present invention provides a scalable all-optical switching element that includes a combination of 1×N wavelength selective switches (WSS), 1×N splitters/combiners, optical amplifiers, and tunable filters to provide a fully non-blocking solution which can be deployed in a scalable manner. The 1×N splitters are configured to split multiples copies of a plurality of drop wavelengths which can be amplified and sent to a tunable filter which selects out a particular wavelength for drop. The 1×N combiners are configured to combine multiple add wavelengths for egress transmission.

In an exemplary embodiment of the present invention, a directionless reconfigurable optical add-drop multiplexer includes an ingress device receiving a plurality of wavelengths from an input connection, wherein the ingress device is configured to provide one or more of the plurality of wavelengths on a first output and a second output; a splitter connected to the first output of the ingress device, wherein the splitter is configured to split the one or more of the plurality of wavelengths from the first output into multiple copies of the one or more of the plurality of wavelengths, and wherein the multiple copies are provided on a plurality of outputs; a switch connected to the plurality of outputs from the splitter and a plurality of tunable filters, wherein the switch is configured to switch each of the multiple copies to one or more of the plurality of tunable filters, wherein each of the plurality of tunable filters is configured to tune to a wavelength passband to provide a single output of the plurality of wavelengths; and an egress device receiving the second output. The directionless reconfigurable optical add-drop multiplexer can further include a combiner connected to the egress device and to the switch, wherein the switch is configured to switch a plurality of inputs to the combiner for transmission from the egress device.

Optionally, the switch includes a first switch fabric and a second switch fabric; wherein the first switch fabric provides connections between the plurality of outputs from the splitter and a plurality of tunable filters; and the second switch fabric provides connections between the combiner and the plurality of inputs. Alternatively, the directionless reconfigurable optical add-drop multiplexer further includes an amplifier connected between the first output of the ingress device and the splitter, wherein the amplifier is configured to amplify the one or more of the plurality of wavelengths on the first output prior to the splitter. Optionally, the ingress device includes a wavelength selective switch, the switch includes a photonic cross-connect, and the egress device includes a coupler. Alternatively, the ingress device includes a coupler, the switch includes a photonic cross-connect, and the egress device includes a wavelength selective switch. Optionally, the ingress device includes a wavelength selective switch, the switch includes a photonic cross-connect, and the egress device includes a wavelength selective switch.

In another exemplary embodiment of the present invention, an N degree directionless optical node includes an N degree reconfigurable optical-add drop multiplexer configured to receive inputs from each of N ingress degrees and to transmit outputs to each of N egress degrees; N 1×B splitters each connected to one of the N ingress degrees through the N degree reconfigurable optical-add drop multiplexer, wherein B is an integer; and a switch with S×T ports connected to the N 1×B splitters and to one or more tunable filters and connected to N 1×B combiners and to one or more input signals, wherein each of the one or more tunable filters is configured to tune to a wavelength passband to provide a single wavelength output, and S and T are integers greater than one; wherein the N 1×B combiners each connect to one of the N egress degrees through the N degree reconfigurable optical-add drop multiplexer. The each of the N 1×B splitters are configured to broadcast received inputs to B output ports; wherein each of the B output ports connect to the switch and the switch is configured to route each of the B output ports to one of the one or more tunable filters; and the one of the one or more tunable filters tunes to the single wavelength output of the broadcast received inputs.

The N degree directionless optical node can further include N 1×A splitters; a first plurality of optical amplifiers; N 1×A combiners; a second plurality of optical amplifiers; wherein each of the N 1×A splitters is located between the N degree reconfigurable optical-add drop multiplexer and the N 1×B splitters; each of the first plurality of optical amplifiers is located between the N 1×A splitters and the N 1×B splitters; each of the N 1×A combiners is located between N degree reconfigurable optical-add drop multiplexer and the N 1×B combiners; each of the second plurality of optical amplifiers is located between the N 1×A combiners and the N 1×B combiners; and A is based on the number of channels capable of being dropped and added per degree. The N 1×A splitters and the N 1×B splitters are configured to broadcast received inputs to A*B output ports; wherein each of the A*B output ports connect to the switch and the switch is configured to route each of the A*B output ports to one of the one or more tunable filters; and the one of the one or more tunable filters tunes to the single wavelength output of the broadcast received inputs.

Optionally, the switch includes a first switch; and the N degree directionless optical node further includes a second switch with U×V ports located between the N 1×A splitters and the first plurality of optical amplifiers and between the N 1×A combiners and the second plurality of optical amplifiers. Alternatively, the switch includes a first switch fabric and a second switch fabric; wherein the first switch fabric provides connections between the N 1×B splitters and to one or more tunable filters; and the second switch fabric provides connections between the N 1×B combiners and the one or more input signals. The N degree directionless optical node can further include one or more of a bank of amplifiers, a bank of transceivers, a bank of combiners, a bank of regenerators, and a bank of wavelength converters connected to the switch. Optionally, the one or more tunable filters include any of thin-film filters, a planar lightwave circuit, a micro electromechanical system, and a coherent optical receiver electric domain filter. The N degree directionless optical node is fully non-blocking responsive to a selection of the values of N, A, B, S, T, U, and V responsive to a number of drop channels per degree.

In yet another exemplary embodiment of the present invention, a directionless method for adding and dropping wavelengths with a reconfigurable optical-add drop multiplexer includes receiving a plurality of wavelengths at an ingress degree of the reconfigurable optical-add drop multiplexer; routing one or more of the plurality of wavelengths to one or more egress degrees of the reconfigurable optical-add drop multiplexer; broadcasting dropped wavelengths to a switch, wherein the dropped wavelengths comprise one or more of the plurality of wavelengths; switching the broadcasted dropped wavelengths to one or more tunable filters; and filtering at each of the one or more tunable filters to provide one output of the broadcasted dropped wavelengths. The directionless method can further include receiving an input wavelength at the switch; switching the input wavelength to one or more combiners based on an egress degree for the input wavelength; combining the input wavelength with additional input wavelengths; and routing the combined input wavelength and the additional input wavelengths to one of the one or more egress degrees of the reconfigurable optical-add drop multiplexer. Optionally, the directionless method further includes amplifying the dropped wavelengths either prior to broadcasting or while broadcasting. The one or more tunable filters can include any of thin-film filters, a planar lightwave circuit, a micro electromechanical system, and a coherent optical receiver electric domain filter.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides a directionless reconfigurable optical add/drop multiplexer (ROADM) system. The present invention provides a scalable all-optical switching element that includes a combination of 1×N wavelength selective switches (WSS), 1×N splitters/combiners, optical amplifiers, and tunable filters to provide a fully non-blocking solution which can be deployed in a scalable manner. The 1×N splitters are configured to split multiples copies of a plurality of drop wavelengths which can be amplified and sent to a tunable filter which selects out a particular wavelength for drop. The 1×N combiners are configured to combine multiple add wavelengths for egress transmission.

The present invention provides a cost-effective, scalable, and flexible solution to directionless ROADMs. The present invention can provide a lower cost networking solution than one that relies on electronic switching for high speed optical networks with transmission rates of 40 Gb/s, 100 Gb/s, and higher. Advantageously, the present invention is compatible with existing ROADM solutions, uses existing component technology, and has a low up front cost (i.e., the most expensive elements (tunable filters and transceivers) can be added in a "pay-as-you-grow" manner), is a true directionless system with non-blocking functionality for relatively high channel counts. Additionally, the directionless ROADM can have reduced fiber interconnects by combining 1×N splitter/combiners and their subtending PXC in a single module. For example, integrating an array of 1×8 splitters with a 128×128 PXC reduces the number of inputs from 128 to 16.

Figure 1:
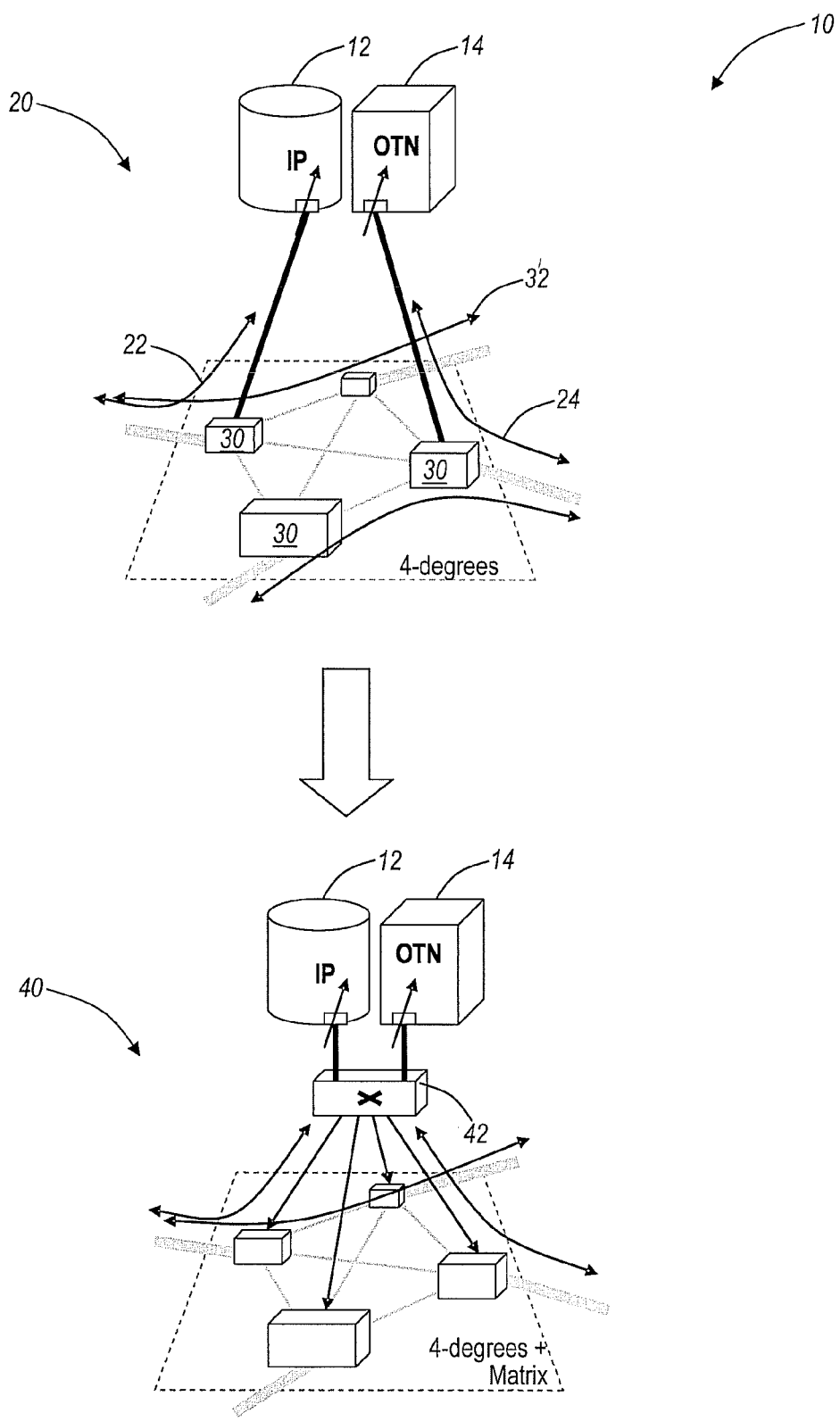
FIG. 1 is a diagram of an exemplary 4-degree reconfigurable optical add/drop multiplexer (ROADM) with two add/drop clients, i.e. an Internet Protocol (IP) router/switch and an Optical Transport Network (OTN) switch in both a direction-constrained architecture and a direction-independent (i.e., "directionless") architecture.
Figure 2:
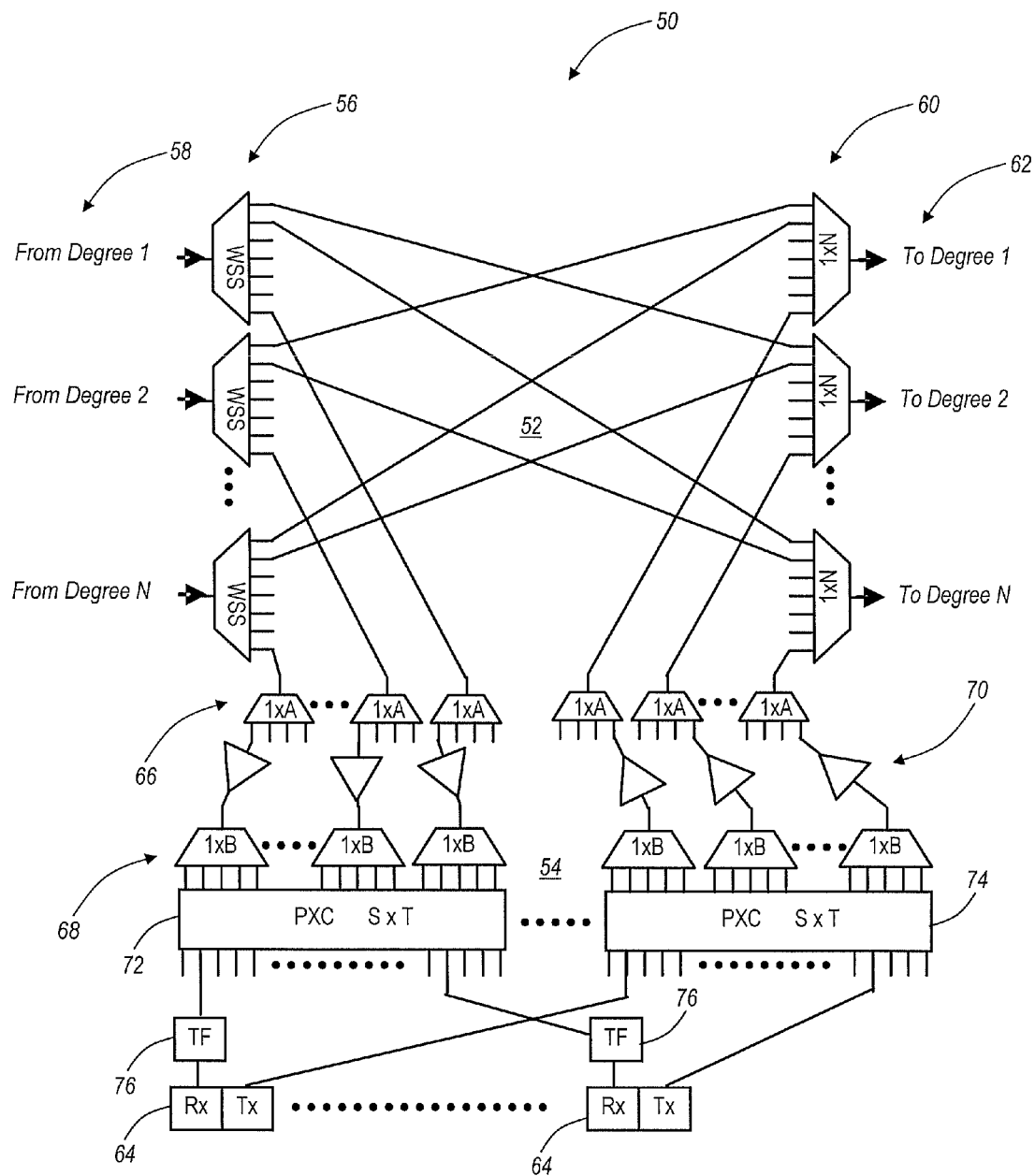
FIG. 2 is a diagram of a directionless ROADM for N degrees with 1×N wavelength selective switch (WSS) modules used on a drop side and 1×N combiners used on an add side according to an exemplary embodiment of the present invention.

Referring to FIG. 2, a directionless ROADM 50 is illustrated for N degrees according to an exemplary embodiment of the present invention. For illustration purposes, the directionless ROADM 50 is shown as unprotected, and those of ordinary skill in the art will recognize the directionless ROADM 50 can also be deployed in a protected configuration. In FIG. 2, the directionless ROADM 50 is shown with a top section with a multi-degree ROADM configuration 52 and a bottom section with a directionless add/drop configuration 54.

The multi-degree ROADM configuration 52 includes an array of 1×N WSS modules 56 on a drop side (i.e., from degrees 1, 2, . . . , N 58), and a similar array of 1×N combiners 60 on an add side (i.e., to degrees 1, 2, . . . , N 62), where N represents the degree of the ROADM 50. The 1×N WSS modules 56 and the 1×N combiners 60 can be realized by a variety of techniques known to those of ordinary skill in the art.

The directionless add/drop configuration 54 is configured to provide directionless add/drop capabilities to multiple transceivers 64. As described herein, transceivers 64) can be routed to any device or degree. The directionless add/drop configuration 54 includes splitter and combiner modules 66, 68 with 1×A ports 66 and 1×B ports 68, optical amplifiers 70, photonic cross-connects (PXC) 72, 74, and tunable filters (TF) 76. The splitter and combiner modules 66, 68 can be realized with PLC, fused fiber components, and the like.

The optical amplifiers 70 are utilized to compensate for coupler/switch losses. Different amplifier designs can be used on the add and drop sides depending on the gain and output power needed. The PXCs 72, 74 are configured to switch wavelengths between a plurality of ports. Each PXC 72, 74 is configured with S network-facing ports (i.e., connected to the 1×B ports 68) and T client facing ports (i.e., connected to the TFs 76) to provide an S×T sized PXC 72, 74. The PXC 72, 74 can be realizing with micro electromechanical systems (MEMS) mirrors, actuated collimators, and the like. The TFs 76 are configured to be wavelength-tunable to select one of any of the available WDM wavelengths available. The TFs 76 can be realized with thin-film filters, PLC, MEMS, electric-domain filtering after an optical coherent receiver and the like. The TFs 76 can be designed to include specific channel spacings, e.g. 50 GHz, 100 GHz, etc., which are fully arbitrarily selected without intermediate dead zones. For example, the selection of the TFs 76 can be done remotely through software.

With regards to signal flow through the directionless ROADM 50, WDM channels originating from any one of the degrees 1, 2, ..., N 58 are arbitrarily routed by the WSS 56 associated with the degree 1, 2, ..., N 58 to N possible output ports. If N is the actual degree of the node, then (N−1) of these ports are used as express ports and connected to the N×1 combiners 60 to form the multi-degree wavelength routing fabric, i.e. the multi-degree ROADM configuration 52. At least one WSS 56 port can be used for local drop channels, connected to one of the 1×A splitters 66, which feeds into one or more of the 1×B splitters 68. Note, the 1×A splitters 66 and 1×B splitters 68 can also function as 1×A couplers 66 and 1×B couplers 68 in the opposite (i.e., add) direction. The optical amplifier 70 can be required between the splitter 66, 68 stages to compensate for their loss. The splitters 66, 68 are configured to broadcast the drop channels from one degree 58 to up to (A*B) output ports, i.e. every splitter port contains all the drop channels from that particular degree 58.

The S×T PXC 72 is then connected to at least one 1×B coupler 68 from each degree 58. Additionally, in the add direction, the S×T PXC 74 is also connected to at least one 1×B couplers 68 to each degree 62 through the amplifiers 70 and the 1×A couplers 66. Depending on the value of S and B and the number of degrees, there could be multiple 1×B splitters 68 on the same PXC 72, 74 associated with the same degree 58, 62. There could also be multiple PXCs 72, 74 connected in parallel using different ports of the 1×A splitters 66 in order to scale to higher channel counts or to provision redundant switch fabrics.

The role of the PXC 72, 74 is to select the appropriate degree for each transceiver 64 that is connected to one of the T output ports of the PXC 72, 74. The Rx portion of the transceiver 64 must be preceded by the TF 76 to select one particular channel from that degree since every splitter port contains all the drop channels from that particular degree 58. This configuration therefore allows the transceiver 64 to receive any channel from any degree 58. For the Tx (Add) side, the signal flow is reversed and the only significant difference is that no TF is required since the channels are being combined rather than demultiplexed, i.e. there is only one channel on the connection from the Tx to the PXC 74.

Scaling Rules for the ROADM Configuration

The required number of ports for the 1×N WSS modules 56 (N), the combiners/splitters 66, 68 (N, A, B), and the PXCs 72, 74 (S,T) depend on the number of degrees 58, 62 and the number of add/drop channels per degree 58, 62 (D) that need to be supported. The basic scaling rules include: (1) to support degree 58, 62 N nodes, the WSS modules 56 require at least 1×N ports and the combiners/splitters 66, 68 require at least 1×N ports (i.e., A and B are each equal to or greater than N); and (2) to support D drop channels per degree 58, 62 requires $A*B \geq D$.

If the input ports of the PXC 72, 74 are divided evenly among the different degrees 58, 62, then the number of 1×B splitters 68 associated with each degree 58, 62 within the PXC 72, 74 is equal to truncation of (S/(N*B)), and the number of PXC 72, 74 input ports associated with each degree 58, 62 is m*B, where m=trunc(S/(N*B)), i.e. the number of 1×B splitters 68 associated with each degree 58, 62 within the PXC 72, 74. In an ideal implementation, m*B should be greater or equal to D, i.e. there should be at least as many PXC 72, 74 input ports as there are drop channels for each degree 58, 62. In that case, the required number of PXC 72, 74 output ports is $T \geq N*D$. This case is always non-blocking, i.e. any transceiver 64 connected to the PXC 72, 74 can access any channel on any degree 58, 62, regardless of how the other transceivers 64 connected to the same PXC 72, 74 are configured.

In the case where the maximum number of drop channels exceeds the number of inputs available on a single PXC 72, 74 (i.e., D>m*B), then additional PXCs 72, 74 need to be provisioned using available ports in the 1×A splitters 66. This allows more transceivers 64 to be provisioned, but can also create blocking situations, i.e. cases where a transceiver 64 cannot access a particular degree 58, 62 because all input PXC 72, 74 ports associated with that degree are already in use by other transceiver 64. The only way to achieve a fully non-blocking configuration is to limit the number of transceivers 64 connected to each PXC 72, 74 to $T \leq m*B$, which would typically leave a lot of PXC 72, 74 ports unused.

For example, assume a degree-4 directionless ROADM 50 is designed using a 128×128 PXC as a building block. The splitter stages are chosen to be A=12 and B=8. Since S=128 and N=4, there could be up to 32 drop ports connected to a PXC from each degree, which would require a total of sixteen 1×8 splitters (four per degree, m=4), occupying 4 of the 12 available ports in each 1×A splitter/combiner. This configuration is fully non-blocking for a maximum of 32 Add/Drop channels per degree (D=32) and the maximum number of transceivers could be 128.

To scale the node to higher channel counts, two more 128×128 PXCs can be added to both the Add and Drop directions using the available 1×A splitter/combiner ports connected to 64 additional 1×8 splitter/combiners. This allows up to 384 transceivers to be connected to the node or D=96 channels per degree. However, to achieve a fully non-blocking configuration, a maximum of 32 transceivers could be connected to each PXC, for a maximum of 96 transceivers at the node; in this case, the 96 transceivers can be assigned to the different degrees arbitrarily, including sending all 96 transceivers to the same degree.

Figure 3:
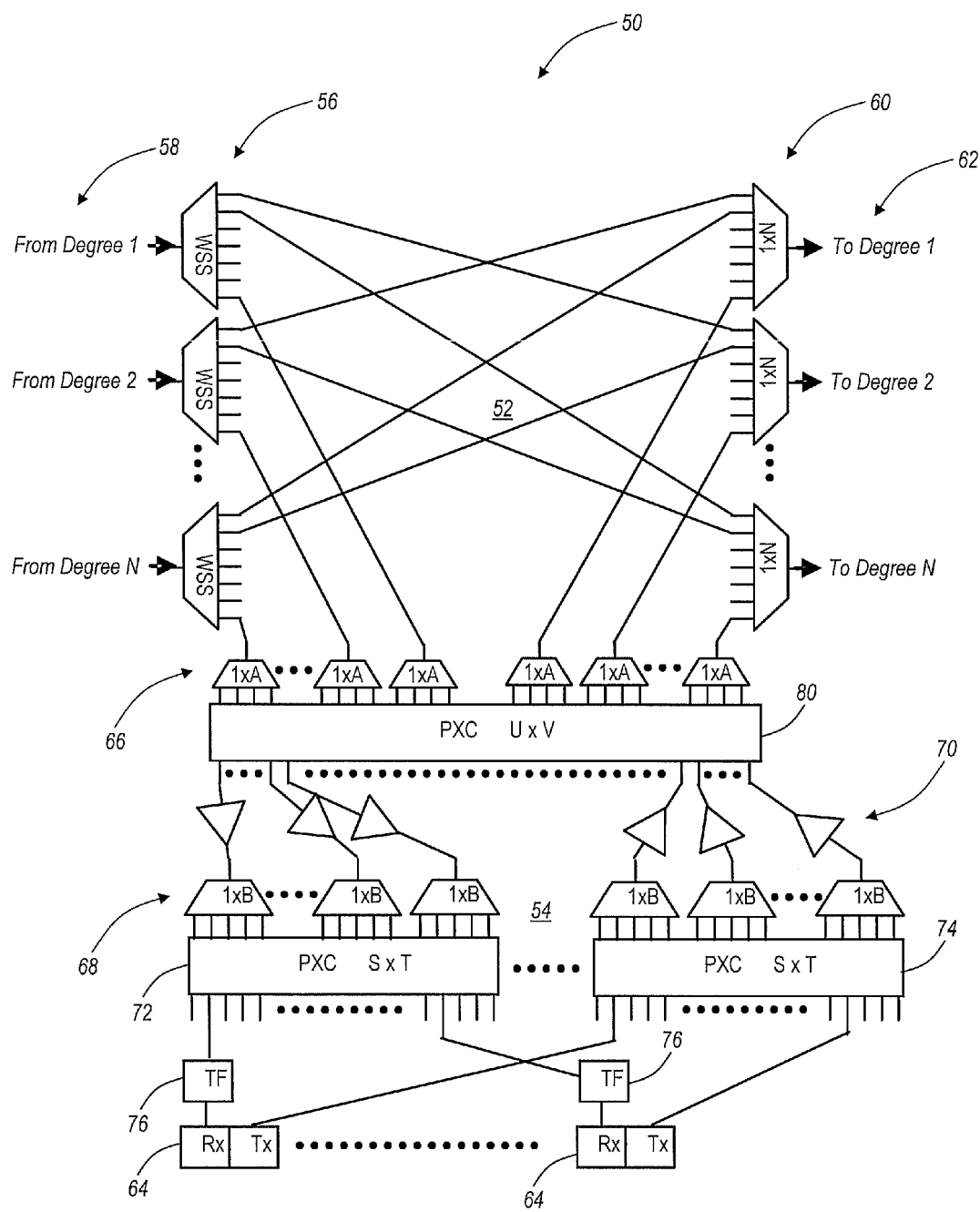
FIG. 3 is a diagram of the directionless ROADM of FIG. 2 with a second photonic cross-connect (PXC) layer for better scalability while avoiding blocking situations according to an exemplary embodiment of the present invention.

Referring to FIG. 3, to provide better scalability while avoiding blocking situations, a second PXC layer 80 can be added to the directionless ROADM 50 according to an exemplary embodiment of the present invention. The second PXC layer 80 includes a U×V PXC which makes it possible to dynamically assign the S×T PXC 72, 74 ports to different degrees 58, 62. This way, if one of the PXCs 72, 74 runs out of available ports for a particular degree 58, 62, unused ports can be reassigned to that degree 58, 62 so that additional transceiver 64 can be connected to it. In FIG. 3, the U×V PXC 80 is shown as a bidirectional device, i.e. a single device shared by the Add and Drop directions. It could also be realized with two separate modules (one for Add and one for Drop) or even by using some of the unused ports of the S×T PXCs 72, 74.

Figure 4:
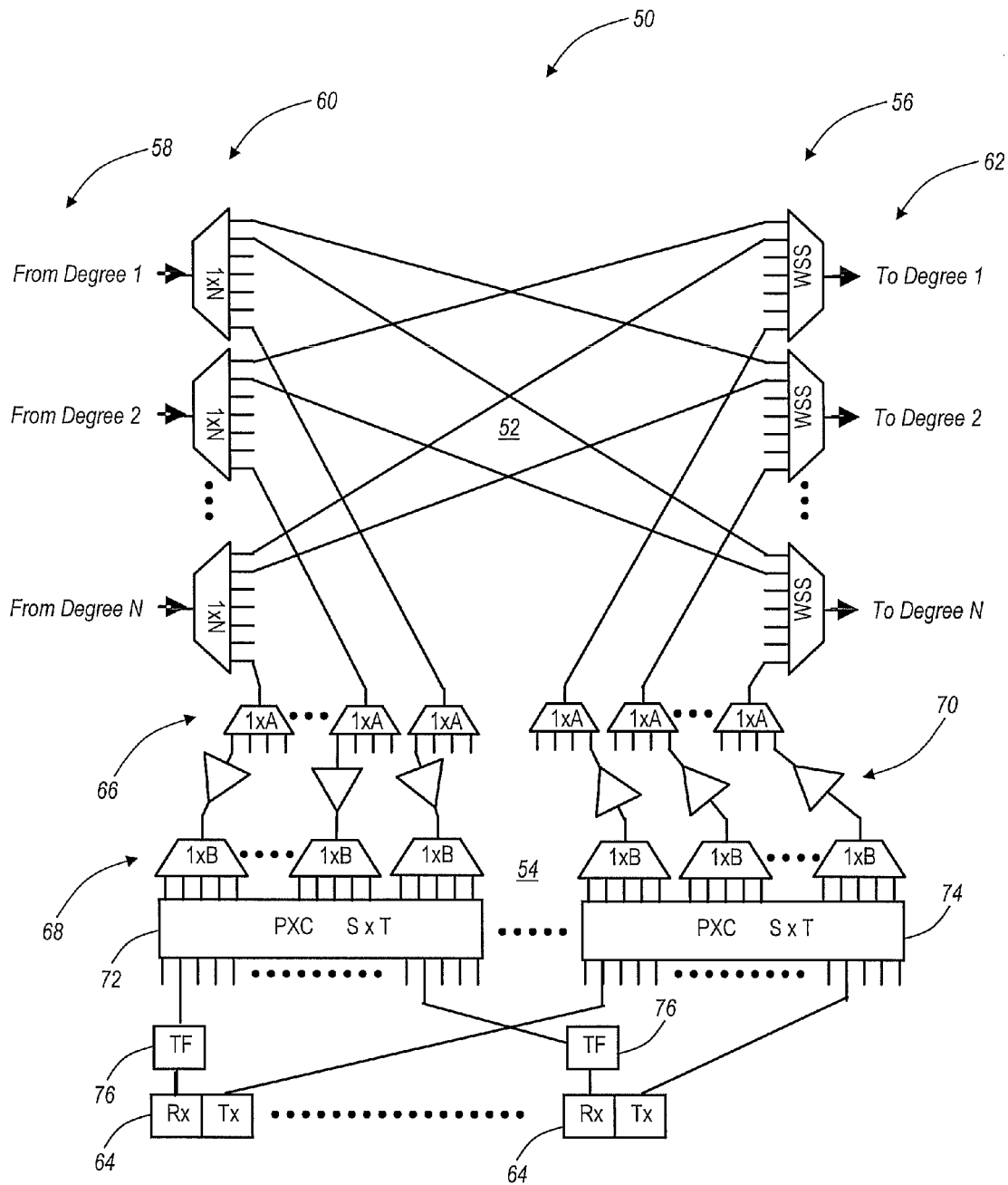
FIG. 4 is a diagram of the directionless ROADM of FIG. 2 with 1×N wavelength selective switch (WSS) modules used on the add side and 1×N combiners used on the drop side according to an exemplary embodiment of the present invention.
Figure 5:
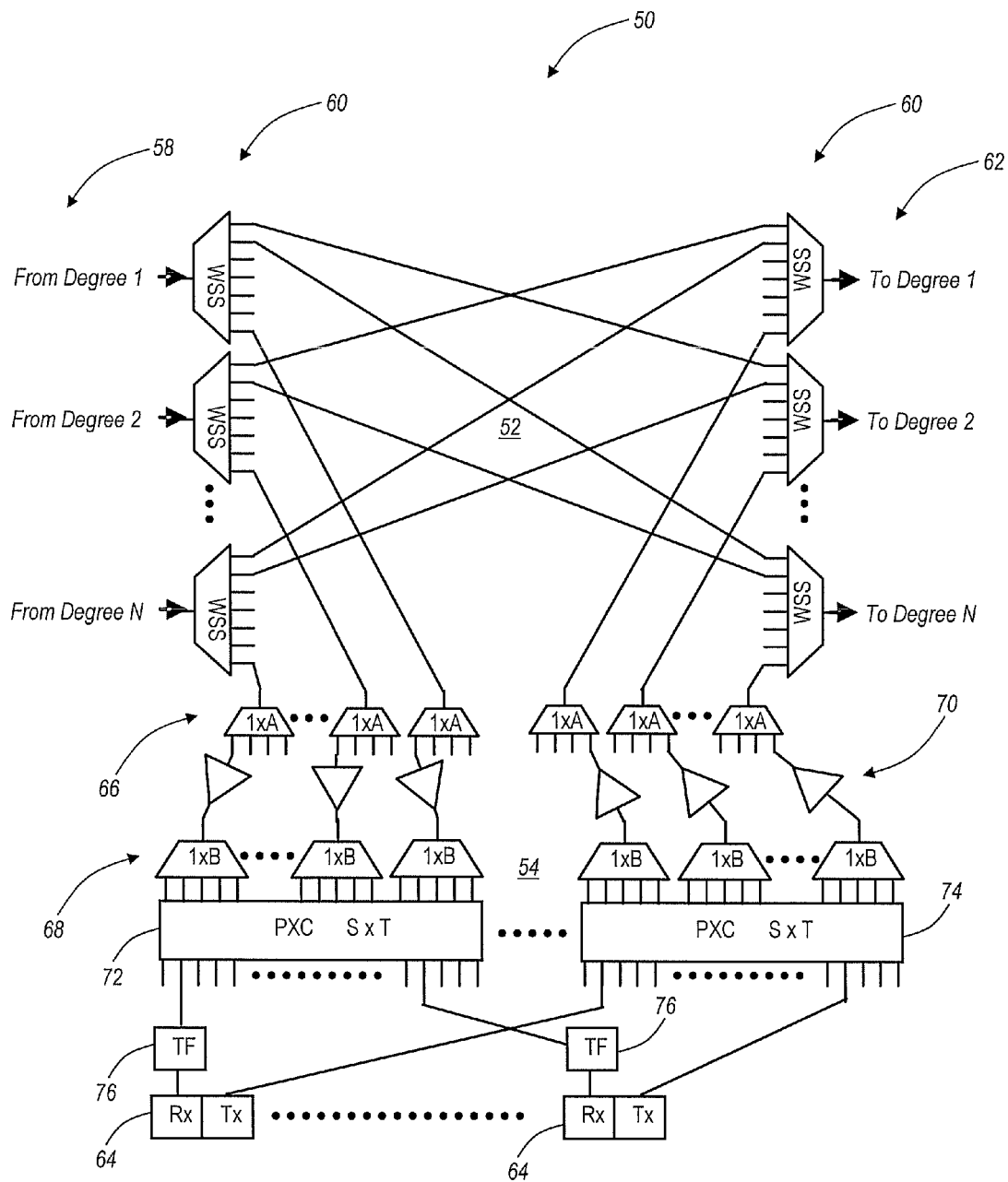
FIG. 5 is a diagram of the directionless ROADM of FIG. 2 with 1×N WSS modules used on both the add and drop side according to an exemplary embodiment of the present invention.

Referring to FIGS. 4 and 5, the directionless ROADM 50 can include different configurations with regard to the 1×N WSS modules 56 and the 1×N combiners 60 according to exemplary embodiments of the present invention. FIG. 4 illustrates the 1×N combiners 60 used on the drop side, i.e. degrees 58, and the 1×N WSS modules 56 on the add side, i.e. degrees 62. Here, the 1×N combiners 60 are used as 1×N splitters. FIG. 5 illustrates using the 1×N WSS modules 56 on both sides, i.e. both degrees 58, 62.

All three configurations, i.e. FIGS. 2, 4, and 5, of the directionless ROADM 50 provide the same directionless ROADM functionality, but using a 1×N WSS module 56 instead of a 1×N splitter/combiner 60 offers advantages. On the drop side, i.e. degrees 58, the 1×N WSS module 56 limits the number of channels going into the drop amplifier 70, which means that a higher power per channel can be achieved at the output of the amplifier 70. On the add side, i.e. degrees 62, the 1×N WSS module 56 can be used to filter out some of the amplified spontaneous emission (ASE) coming from the add amplifiers 70, which otherwise degrade the optical signal to-noise ratio (OSNR) of the express channels. Accordingly, the directionless ROADM in FIG. 5 offers the best of both worlds but is significantly more expensive since the cost of the 1×N WSS module 56 is much higher than that of the 1×N splitter/combiner 60.

Figure 6:
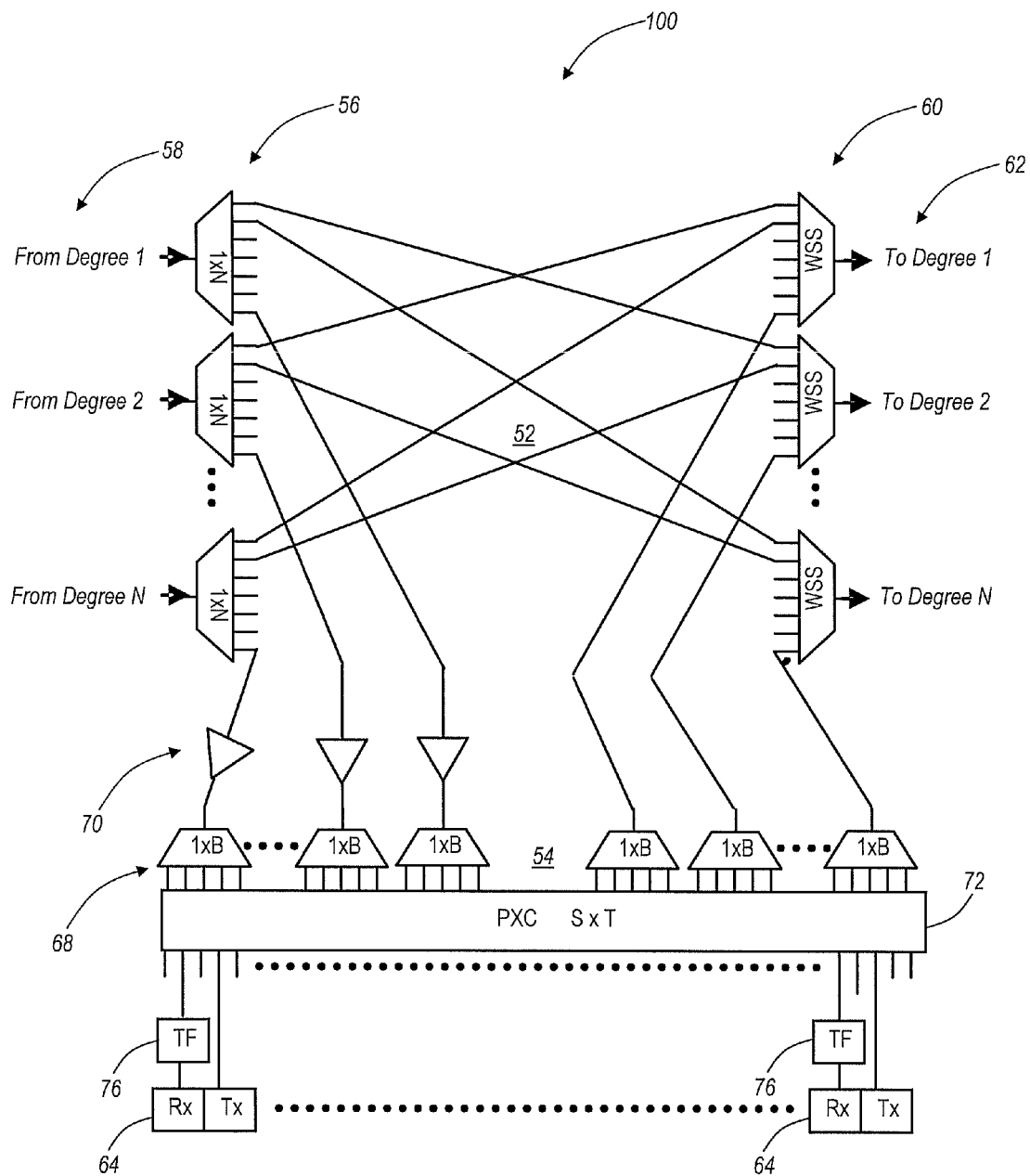
FIG. 6 is a diagram of a directionless ROADM with a single layer of splitter/combiners for reduced add/drop requirements according to an exemplary embodiment of the present invention.

Referring to FIG. 6, for reduced add/drop requirements, it is possible to build a directionless ROADM 100 with a smaller number of elements. The directionless ROADM 100 includes a single layer of 1×B splitter/combiners 68, which reduces add/drop insertion loss, but limits the number of channels per degree 58, 62 to a total of B instead of A*B. The reduction in insertion loss could make it possible in some cases to eliminate amplifiers 70, such as on the add side, i.e. degree 62. Also, the same PXC 72 can be shared by both add and drop channels. This reduces the maximum number of add/drop channels by a factor of two, but also reduces the cost of the node significantly. The directionless ROADM 100 can be deployed at nodes with reduced requirements for add/drop to provide cost savings.

Adjustable Filter Bandwidth:

In some systems, different WDM channels may be transmitting data at significantly different bit rates (e.g. 10 Gb/s, 40 Gb/s, 100 Gb/s, etc.) or different modulation formats (e.g., on-off Keying, phase-shift keying, etc.). For optimized system performance, the optical bandwidth of the tunable filter 76 should ideally be tailored to the bit rate and modulation format of each channel type. This can be realized simply by provisioning each transceiver 64 type with a tunable filter 76 of the appropriate bandwidth, i.e. integration of the TF 76 into the transceiver 64. A more flexible solution can include TFs 76 with adjustable optical bandwidth. Such filters are available on the market today and could be provisioned via software to match any given channel type. Alternately, TFs 76 can be implemented as electric domain filters following an optical coherent receiver. Advantageously, the TFs 76 enable the directionless ROADM of the present invention to overcome static channel spacing, e.g. 50 GHz, 100 GHz, etc., and the TFs 76 avoid any dead zones, i.e. guard bands, etc., between active passbands as are common on static filters.

Figure 7:
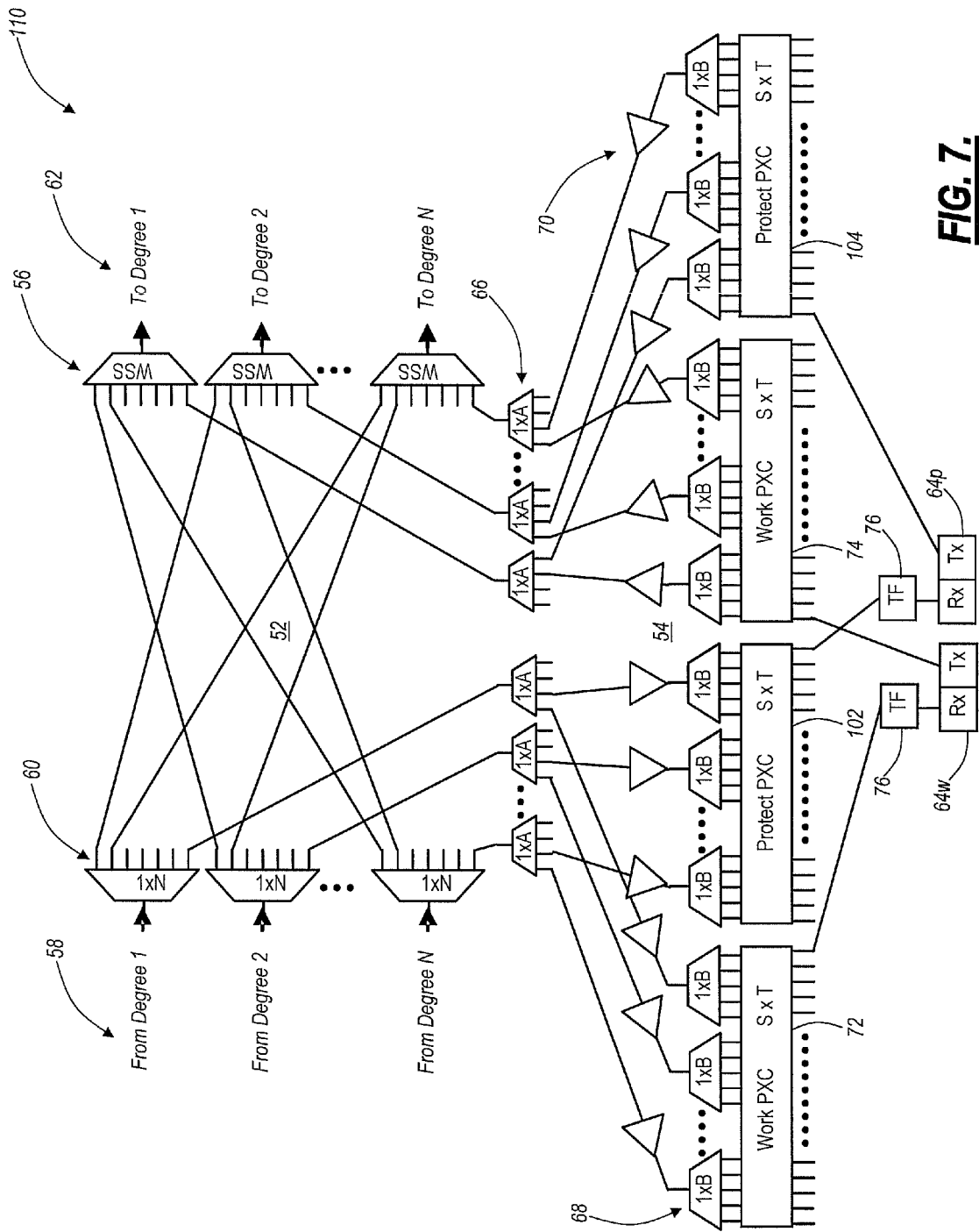
FIG. 7 is a diagram of a protected configuration of the directionless ROADM with parallel PXCs along with the other components of the directionless ROADM to provide client level protection according to an exemplary embodiment of the present invention.

Protection/Redundancy:

Referring to FIG. 7, the broadcast nature of the directionless ROADMs 50, 100 described herein makes it straightforward to add redundancy and optical protection to the node, simply by provisioning parallel (work and protect) PXCs 72, 74, 102, 104 in the Add and Drop directions. FIG. 7 illustrates a protected configuration 110 of the directionless ROADM 50 including the parallel PXCs 72, 74, 102, 104 along with the other components of the directionless ROADM 50. In the protected configuration 110, a local client has the ability to select one of two (work and protect) transceivers 64w, 64p to access the node via the redundant PXC 72, 74, 102, 104 fabrics. The client normally connects through the work path through PXCs 72, 74, but in the case of an equipment failure in any of the elements in the work path (transceiver 64w, PXC 72, 74, amplifier 70, combiner/splitter 66, 68), the client switches to the protect path through PXCs 102, 104. In this example, the protection switch can occur on the client side of the transceivers 64w, 64p via a conventional optical or electrical switch (not shown). Additionally, the directionless ROADM 100 can also be configured in the protected configuration 110 to provide redundancy and optical protection for a reduced add/drop configuration. Also, the protected configuration 110 is illustrated with the directionless ROADM 50 configuration of FIG. 4, and those of ordinary skill in the art will recognize the protected configuration 110 can also be implemented with the configurations of FIG. 2-5.

Figure 8:
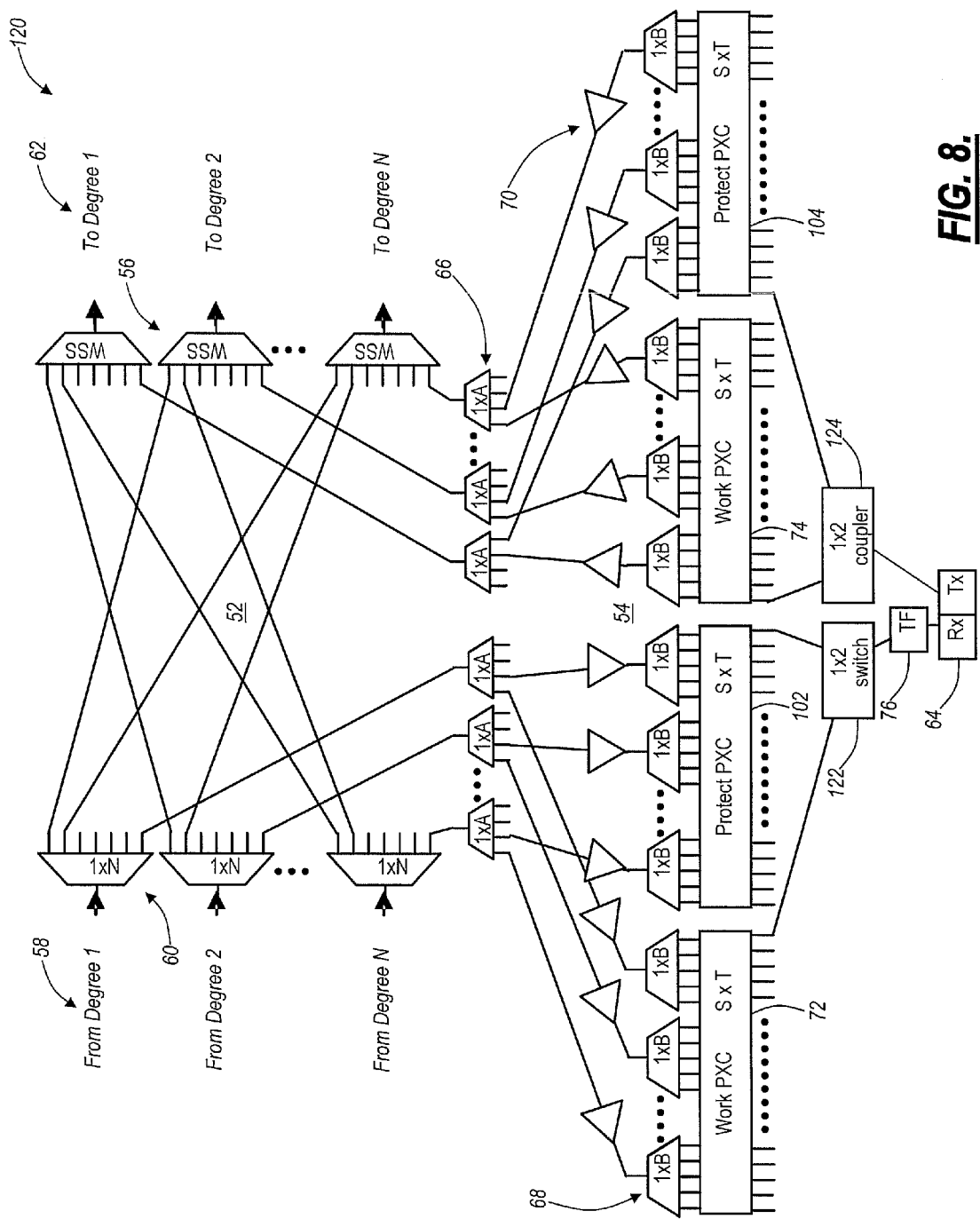
FIG. 8 is a diagram of an optically protected configuration of the directionless ROADM including the parallel PXCs, a 1×2 switch, a 1×2 coupler, and the other components of the directionless ROADM for providing protection of an unprotected transceiver according to an exemplary embodiment of the present invention.

Referring to FIG. 8, the directionless ROADMs 50, 100 described herein can also be configured to provide protection for unprotected (e.g., 0:1) transceivers 64. FIG. 8 illustrates an optically protected configuration 120 of the directionless ROADM 50 including the parallel PXCs 72, 74, 102, 104, a 1×2 switch 122, a 1×2 coupler 124, and the other components of the directionless ROADM 50 for providing protection of an unprotected transceiver 64. In the optically protected configuration 120, only one transceiver 64 is connected to each client but redundancy and protection is still being provided for the directionless ROADM 50 modules. Following a failure of the PXC 72, splitter/combiner 66, 68, or amplifier 70 in the drop path (i.e., degrees 58), the 1×2 switch 122 actuates to connect the Rx of the transceiver 64 to the protect path through the PXC 102. On the add side (i.e., degrees 62), the 1×2 coupler 124 is typically used to send two copies of the Tx signal down redundant paths, i.e. through both PXCs 74, 104. A corresponding 1×2 switch 122 is used at a drop side of another node associated with the degrees 62 to provide the optical protection switching. If an application requires that the Tx and Rx signal simultaneously switch to the protect path in case of an equipment failure, then the 1×2 switch 122 could be used instead of the 1×2 coupler 124.

Figure 9:
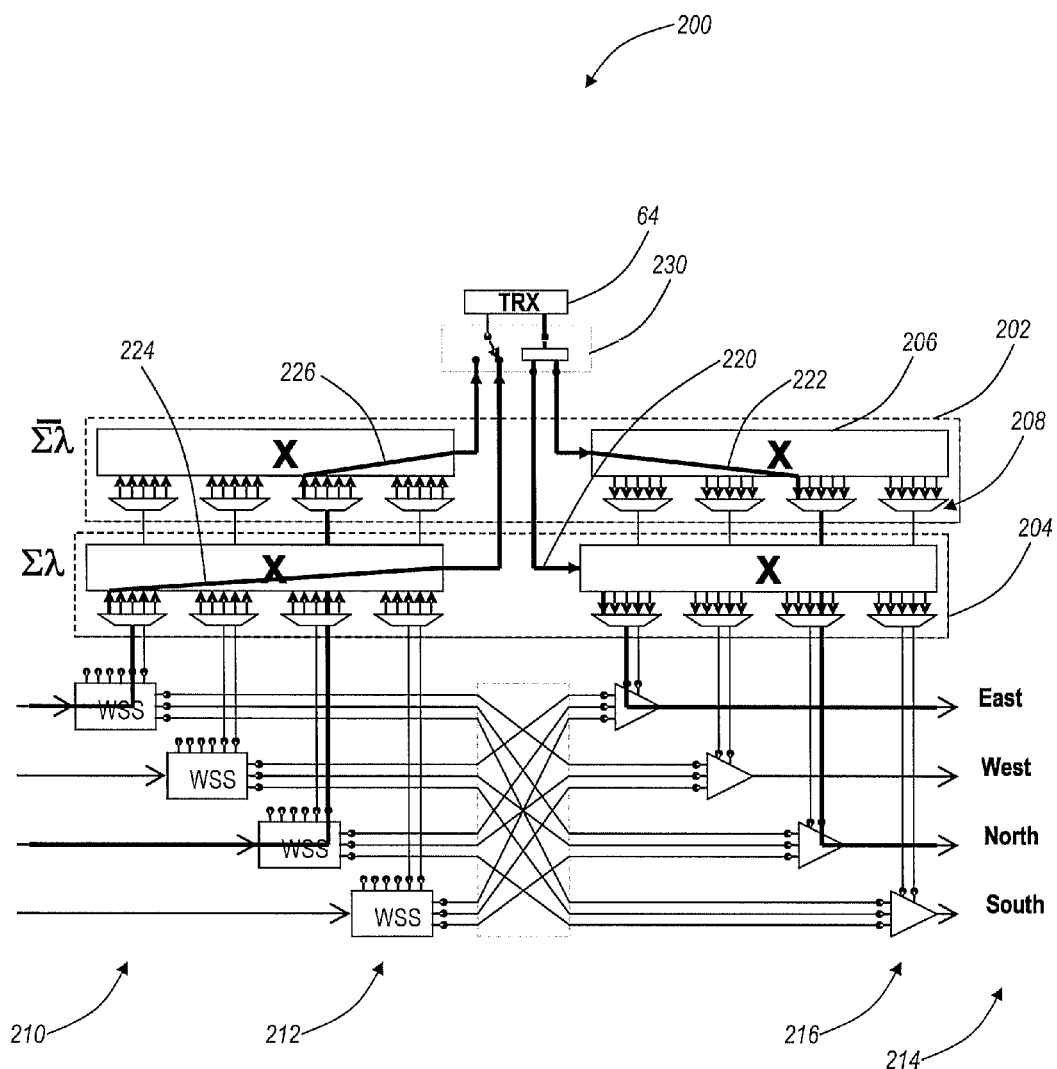
FIG. 9 is a diagram of a directionless ROADM configured with separate unprotected PXCs for providing a lower cost directionless solution with a requirement for some additional traffic engineering complexity according to an exemplary embodiment of the present invention.

Referring to FIG. 9, a directionless ROADM 200 can be configured with separate unprotected PXCs 202, 204 to provide a lower cost directionless solution with a requirement for some additional traffic engineering complexity. The directionless ROADM 200 is illustrated in a degree-4 configuration, i.e. North, South, East, and West, and those of ordinary skill in the art will recognize the directionless ROADM 200 could be deployed in any arbitrary degree configuration.

Each PXC 202, 204 includes a photonic switch matrix 206 and multiple splitters/combiners 208. The splitters/combiners 208 provide a similar functionality as the splitters/combiners 66, 68 described herein, and the switch matrix 206 is also configured to provide the similar functionality as the PXCs 72, 74. On a drop side 210, the directionless ROADM 200 includes a WSS 212 for each of the four degrees. On an add side 214, the directionless ROADM 200 includes an N×1 coupler 216 for each of the four degrees.

The directionless ROADM 200 requires the use of two drop ports from each of the incoming WSSs 212 for channel drop function and the use of two add ports to each of the outgoing N×1 couplers 216 for the channel add function. Wavelengths dropping from the different WSS 210 ports are connected to the different PXCs 202, 204. The directionless ROADM 200 can support end-to-end service protection by steering work and protect lightpaths (i.e., a wave, channel, etc.) through separate unprotected switch fabrics, e.g. PXCs 202, 204. When protection is required, the directionless ROADM 200 can be configured to steer separate lightpaths across independent pieces of equipment and to different degrees 210, 214.

FIG. 9 illustrates connectivity of an exemplary 'protected' lightpath 220, 222, 224, 226 at a single ROADM location using optical 1+1/tail end protection. The lightpath is launched 1+1 (illustrated as the lightpaths 220, 222) into two separate PXC fabrics and directed to the East and North directions (lightpath 220 is sent East, and lightpath 222 is sent North). Accordingly, from the light source, i.e. the transceiver 64, the lightpaths are kept separate.

On the receiving side, the lightpaths 224, 226 are shown to arrive from the East and North directions (lightpath 224 arrives from the East, and lightpath 226 arrives from the North). The signal arriving from the East (i.e., lightpath 224) is dropped from a WSS drop port to the PXC 204. Because of the blocking nature of the WSS, this means that the wavelength associated with the lightpath 224 from the East is no longer available to drop at any further WSS port. Similarly, the signal arriving from the North (i.e., lightpath 226) direction is dropped using a WSS drop port to the PXC 202. Each of the lightpaths 224, 226 is connected to a local 1×2 protection switch 230 located at the transceiver 64 where the best signal is chosen.

In this implementation, the 1+1 lightpaths 220, 222, 224, 226 are kept separate on both transmit and receive ends of a protected connection. No 'secondary' duplication of the signals needs to take place (e.g., through the PXC switches) because each switch forms part of the chain associated with each arm (or leg) of the two diverse paths. One PXC switches a subset of the wavelengths (X) and the other switches the remaining wavelengths (1−X).

Figure 10:
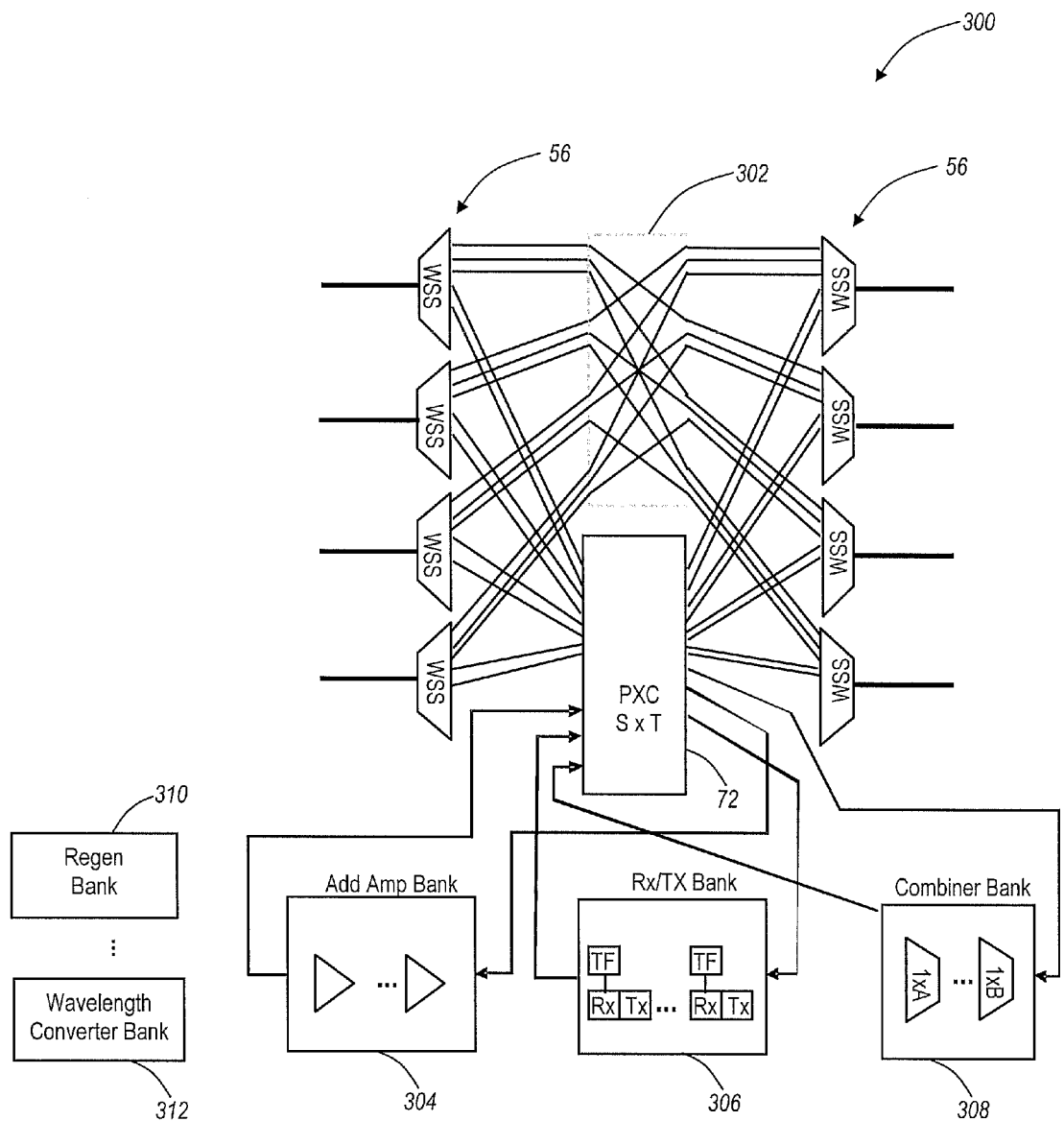
FIG. 10 is a diagram of a directionless ROADM nodal architecture with hardwired express paths between WSS modules and add/drop paths through a PXC according to an exemplary embodiment of the present invention.
Figure 11:
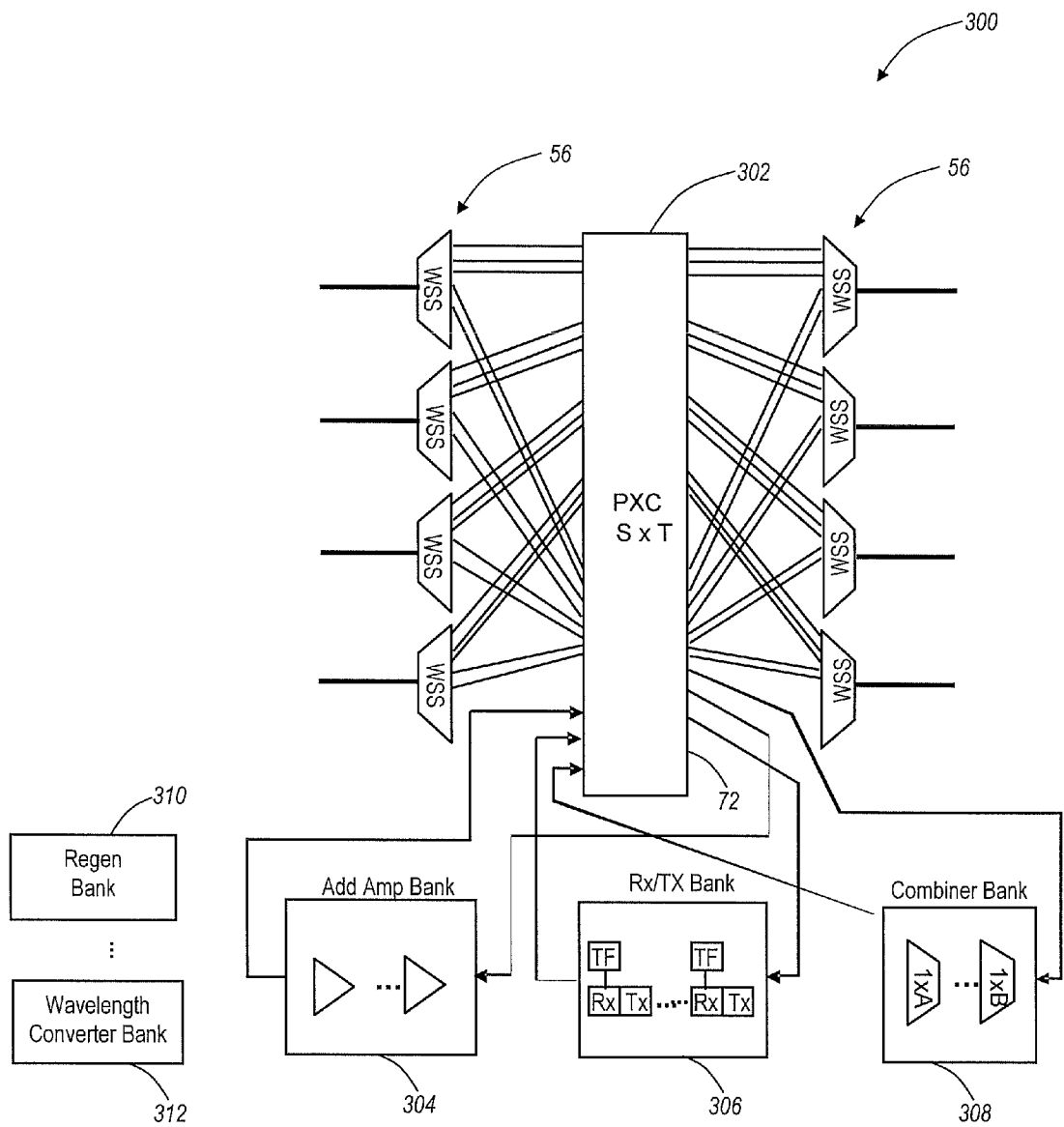
FIG. 11 is a diagram of a directionless ROADM nodal architecture with all paths, i.e. express and add/drop, through a PXC according to an exemplary embodiment of the present invention.

Referring to FIGS. 10 and 11, a generalized ROADM nodal architecture 300 is illustrated for an exemplary degree-4 node according to an exemplary embodiment of the present invention. FIG. 10 illustrates the nodal architecture 300 with hard-wired express paths 302 between WSS modules 56 and add/drop paths through a PXC 72. FIG. 11 illustrates the nodal architecture 300 with all paths, i.e. express and add/drop, through the PXC 72.

The ROADM nodal architecture 300 can include an amplifier bank 304, a transceiver bank 306, a combiner bank 308, a regenerator bank 310, and a wavelength converter bank 312 connected to the PXC 72. The flexibility of the ROADM nodal architecture 300 allows remote and reconfiguration of any ingress/egress wavelength to any of these banks 304, 306, 308, 310, 312. For example, a wavelength or group of wavelengths could be switched to an amplifier in the amplifier bank 304 to provide optical amplification, to a transceiver in the transceiver bank 306 for local add/drop to a client, etc. The combiner bank 308 can provide the functionality described herein with regard to the combiners/splitters 66, 68. The regenerator bank 310 and wavelength converter bank 312 can each include the TF 76 to select out a single wavelength for regeneration or wavelength conversion.

Figure 12:
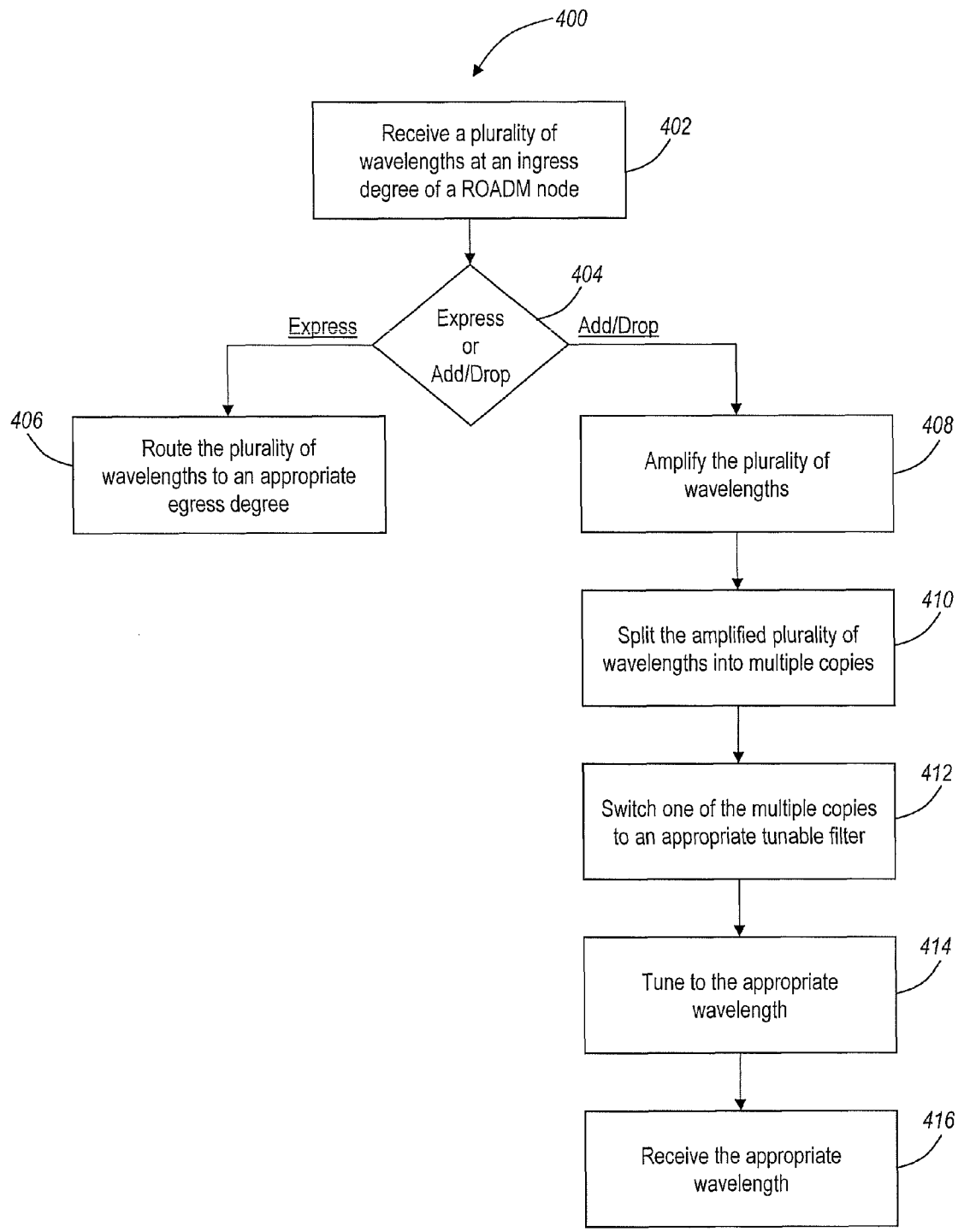
FIG. 12 is a flow chart of signal flow for received wavelengths at an ingress degree of a directionless ROADM node according to an exemplary embodiment of the present invention

Referring to FIG. 12, a flow chart illustrates a signal flow 400 for received wavelengths at an ingress degree of a directionless ROADM node according to an exemplary embodiment of the present invention. The signal flow 400 illustrates operation of either express or add/drop wavelengths at the directionless ROADM node. Those of ordinary skill in the art will recognize that the directionless ROADM node could also include amplification, regeneration, and wavelength conversion, such as illustrated in FIGS. 10 and 11.

The directionless ROADM node receives a plurality of wavelengths at an ingress degree (step 402). The directionless ROADM node could include multiple degrees, and the signal flow 400 is illustrated an exemplary express or add/drop from a single degree. The plurality of wavelengths can be received by a WSS at the ingress degree. The signal flow 400 depends on whether the plurality of wavelengths are express or add/drop (step 404). If the plurality of wavelengths are express, then the plurality of wavelengths are routed to an appropriate egress degree (step 406).

If the plurality of wavelengths are add/drop, then the plurality of wavelengths are amplified (step 408). The amplifier plurality of wavelengths are split into multiple copies (step 410). Also, the plurality of wavelengths could be split prior to amplification, and then split again to provide addition add/drop capacity, e.g. the directionless ROADM of FIGS. 2, 4, and 5. Here, the signal flow 400 is illustrating an example of the directionless ROADM of FIG. 6.

One of the multiple copies is switched to an appropriate tunable filter (step 412). For example, the multiple copies can be switched with a PXC. The appropriate wavelength is tuned to on the tunable filter (step 414). The tunable filter is configured to block all of the plurality of wavelengths except the particular dropped wavelength. Finally, the appropriate, i.e. dropped, wavelength is received (step 416). Alternatively, the signal flow 400 can include regenerators, wavelength converters, and the like with similar steps.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A directionless reconfigurable optical add-drop multiplexer, comprising:
    an ingress device receiving a plurality of wavelengths from an input connection, wherein the ingress device is configured to provide one or more of the plurality of wavelengths on a first output and a second output;
    a splitter connected to the first output of the ingress device, wherein the splitter comprises a plurality of stages, wherein the splitter is configured to split the one or more of the plurality of wavelengths from the first output into multiple copies of the one or more of the plurality of wavelengths, and wherein the multiple copies are provided on a plurality of outputs;
    a switch connected to the plurality of outputs from the splitter and a plurality of tunable filters, wherein the switch is configured to switch each of the multiple copies to one or more of the plurality of tunable filters, wherein each of the plurality of tunable filters is configured to tune to a wavelength passband to provide a single output of the plurality of wavelengths;
    an egress device receiving the second output, wherein the egress device and the ingress device form a plurality of degrees comprising more than two degrees;
    at least one transceiver for local add/drop communicatively coupled to the switch, wherein the at least one transceiver comprises a transmitter directly communicatively coupled to the switch and a receiver communicatively coupled to the switch through a tunable filter of the plurality of tunable filters, wherein the transmitter is configured to selectively transmit to any of the plurality of degrees at the egress device based on the switch and the receiver is configured to receive any of the plurality of wavelengths from any of the plurality of degrees at the ingress device based on the switch and the tunable filter.

2. The directionless reconfigurable optical add-drop multiplexer of claim 1, further comprising:
    a combiner connected to the egress device and to the switch, wherein the switch is configured to switch a plurality of inputs to the combiner for transmission from the egress device.

3. The directionless reconfigurable optical add-drop multiplexer of claim 2, wherein the switch comprises a first switch fabric and a second switch fabric;
    wherein the first switch fabric provides connections between the plurality of outputs from the splitter and a plurality of tunable filters; and wherein the second switch fabric provides connections between the combiner and the plurality of inputs.

4. The directionless reconfigurable optical add-drop multiplexer of claim 1, further comprising:
an amplifier connected between the first output of the ingress device and the splitter, wherein the amplifier is configured to amplify the one or more of the plurality of wavelengths on the first output prior to the splitter.

5. The directionless reconfigurable optical add-drop multiplexer of claim 1, wherein the ingress device comprises a wavelength selective switch, wherein the switch comprises a photonic cross-connect, and wherein the egress device comprises a coupler.

6. The directionless reconfigurable optical add-drop multiplexer of claim 1, wherein the ingress device comprises a coupler, wherein the switch comprises a photonic cross-connect, and wherein the egress device comprises a wavelength selective switch.

7. The directionless reconfigurable optical add-drop multiplexer of claim 1, wherein the ingress device comprises a wavelength selective switch, wherein the switch comprises a photonic cross-connect, and wherein the egress device comprises a wavelength selective switch.

8. An N degree directionless optical node, comprising:
an N, N>2, degree reconfigurable optical-add drop multiplexer configured to receive inputs from each of N ingress degrees and to transmit outputs to each of N egress degrees;
N 1×B splitters each connected to one of the N ingress degrees through the N degree reconfigurable optical-add drop multiplexer, wherein B is an integer;
a switch comprising S×T ports connected to the N 1×B splitters and to one or more tunable filters and connected to N 1×B combiners and to one or more input signals, wherein each of the one or more tunable filters is configured to tune to a wavelength passband to provide a single wavelength output, and wherein S and T comprise integers greater than one; and
at least one transceiver for local add/drop communicatively coupled to the switch, wherein the at least one transceiver comprises a transmitter directly communicatively coupled to the switch and a receiver communicatively coupled to the switch through a tunable filter of the one or more tunable filters, wherein the transmitter is configured to selectively transmit to any of the N egress degrees based on the switch and the receiver is configured to receive any of the plurality of wavelengths from any of the N ingress degrees based on the switch and the tunable filter;
wherein the N 1×B combiners each connect to one of the N egress degrees through the N degree reconfigurable optical-add drop multiplexer.

9. The N degree directionless optical node of claim 8, wherein the each of the N 1×B splitters are configured to broadcast received inputs to B output ports;
wherein each of the B output ports connect to the switch and the switch is configured to route each of the B output ports to one of the one or more tunable filters; and
wherein the one of the one or more tunable filters tunes to the single wavelength output of the broadcast received inputs.

10. The N degree directionless optical node of claim 8, further comprising:
N 1×A splitters;
a first plurality of optical amplifiers;
N 1×A combiners;
a second plurality of optical amplifiers;
wherein each of the N 1×A splitters is located between the N degree reconfigurable optical-add drop multiplexer and the N 1×B splitters;
wherein each of the first plurality of optical amplifiers is located between the N 1×A splitters and the N 1×B splitters;
wherein each of the N 1×A combiners is located between N degree reconfigurable optical-add drop multiplexer and the N 1×B combiners;
wherein each of the second plurality of optical amplifiers is located between the N 1×A combiners and the N 1×B combiners; and
wherein A is based on the number of channels capable of being dropped and added per degree.

11. The N degree directionless optical node of claim 10, wherein the N 1×A splitters and the N 1×B splitters are configured to broadcast received inputs to A*B output ports;
wherein each of the A*B output ports connect to the switch and the switch is configured to route each of the A*B output ports to one of the one or more tunable filters; and
wherein the one of the one or more tunable filters tunes to the single wavelength output of the broadcast received inputs.

12. The N degree directionless optical node of claim 10, wherein the switch comprises a first switch; and
wherein the N degree directionless optical node further comprises a second switch with U×V ports located between the N 1×A splitters and the first plurality of optical amplifiers and between the N 1×A combiners and the second plurality of optical amplifiers.

13. The N degree directionless optical node of claim 8, wherein the switch comprises a first switch fabric and a second switch fabric;
wherein the first switch fabric provides connections between the N 1×B splitters and to one or more tunable filters; and
wherein the second switch fabric provides connections between the N 1×B combiners and the one or more input signals.

14. The N degree directionless optical node of claim 8, further comprising:
one or more of a plurality of amplifiers, a plurality of transceivers, a plurality of combiners, a plurality of regenerators, and a plurality of wavelength converters connected to the switch.

15. The N degree directionless optical node of claim 8, wherein the one or more tunable filters comprise any of thin-film filters, a planar lightwave circuit, a micro electro-mechanical system, and a coherent optical receiver electric domain filter.

16. The N degree directionless optical node of claim 10, wherein the N degree directionless optical node is fully non-blocking responsive to a selection of the values of N, A, B, S, and T responsive to a number of drop channels per degree.

17. A directionless method for adding and dropping wavelengths with a reconfigurable optical-add drop multiplexer, comprising:
receiving a plurality of wavelengths at an ingress degree of the reconfigurable optical-add drop multiplexer, the reconfigurable optical-add drop multiplexer comprises three or more ingress degrees comprising the ingress degree;
routing one or more of the plurality of wavelengths to one or more egress degrees of the reconfigurable optical-add drop multiplexer, wherein the reconfigurable optical-add drop multiplexer comprise three or more egress degrees;

broadcasting dropped wavelengths to a switch via a plurality of distribution stages, wherein the dropped wavelengths comprise one or more of the plurality of wavelengths;

switching the broadcasted dropped wavelengths to one or more tunable filters;

filtering at each of the one or more tunable filters to provide one output of the broadcasted dropped wavelengths; and receiving the one output at a receiver of a transceiver, the receiver communicatively coupled to the one or more tunable filters, wherein the receiver is configured to receive any of the plurality of wavelengths from any of the three or more ingress degrees based on a configuration of the switch thereby enabling the receiver to communicate with any of the egress degrees without a manual disconnect from one of the three or more ingress degrees.

18. The directionless method of claim 17, further comprising:

receiving an input wavelength at the switch from a transmitter of the transceiver;

switching the input wavelength to one or more combiners based on an egress degree for the input wavelength;

combining the input wavelength with additional input wavelengths; and routing the combined input wavelength and the additional input wavelengths to one of the one or more egress degrees of the reconfigurable optical-add drop multiplexer, wherein the transmitter is configured to selectively transmit to any of the three or more ingress degrees based on a configuration of the switch.

19. The directionless method of claim 17, further comprising:

amplifying the dropped wavelengths either prior to broadcasting or while broadcasting.

20. The directionless method of claim 17, wherein the one or more tunable filters comprise any of thin-film filters, a planar lightwave circuit, a micro electro-mechanical system, and a coherent optical receiver electric domain filter.

21. The directionless reconfigurable optical add-drop multiplexer of claim 1, wherein the plurality of stages of the splitter comprise a first splitter stage, a second splitter stage, and an intervening switch.

22. The directionless method of claim 17, wherein the plurality of distribution stages comprise a first splitter stage, a second splitter stage, and an intervening switch.

\* \* \* \* \*